(12) United States Patent
Portner et al.

(10) Patent No.: US 9,787,155 B2
(45) Date of Patent: Oct. 10, 2017

(54) STATOR SYSTEM FOR AN ELECTRIC MOTOR

(71) Applicant: BROSE FAHRZEUGTEILE GMBH & CO. KOMMANDITGESELLSCHAFT, WUERZBURG, Wuerzburg (DE)

(72) Inventors: Stefan Portner, Wuerzburg (DE); Horst Steegmueller, Wuerzburg (DE); Stefan Wust, Lohr am Main (DE)

(73) Assignee: Brose Fahrzeugteile GmbH & Co. Kommanditgesellschaft, Wuerzburg (DE)

(*) Notice: Subject to any disclaimer, the term of this patent is extended or adjusted under 35 U.S.C. 154(b) by 399 days.

(21) Appl. No.: 14/549,678

(22) Filed: Nov. 21, 2014

(65) Prior Publication Data
US 2015/0076952 A1     Mar. 19, 2015

Related U.S. Application Data

(63) Continuation of application No. PCT/EP2013/001541, filed on May 24, 2013.

(30) Foreign Application Priority Data

May 24, 2012   (DE) .......................... 10 2012 010 234

(51) Int. Cl.
*H02K 3/34*      (2006.01)
*H02K 3/38*      (2006.01)
(Continued)

(52) U.S. Cl.
CPC ................ *H02K 3/28* (2013.01); *H02K 3/34* (2013.01); *H02K 3/38* (2013.01); *H02K 3/46* (2013.01);
(Continued)

(58) Field of Classification Search
CPC .. H02K 3/28; H02K 3/34; H02K 3/46; H02K 3/522
(Continued)

(56) References Cited

U.S. PATENT DOCUMENTS

2006/0138883 A1* 6/2006 Yagai ..................... H02K 3/522
                                                              310/71
2007/0170792 A1* 7/2007 Bott ....................... H02K 3/522
                                                              310/71
(Continued)

FOREIGN PATENT DOCUMENTS

DE            19961339 A1      7/2001
DE       202005014302 U1     11/2005
(Continued)

OTHER PUBLICATIONS

Nakanishi et al., Machine Translation of JP2010142075, Jun. 2010.*
(Continued)

*Primary Examiner* — Quyen Leung
*Assistant Examiner* — Eric Johnson
(74) *Attorney, Agent, or Firm* — Laurence A. Greenberg; Werner H. Stemer; Ralph E. Locher

(57) ABSTRACT

A stator system for an electric motor has multiple coil formers and stator windings that are wound on the coil formers. The stator windings are distributed over the circumference of the stator system and are arranged to form a substantially circular stator star. A number of the stator windings are electrically insulated in the axial direction in each case by way of a phase separator. The stator windings in each case of two coil formers are electrically connected as a coil pair in an electrically conductive manner by a conductor track. The conductor track is retained by a separating (Continued)

web that is arranged in the axial direction above the allocated phase separator and that extends in a radial direction.

13 Claims, 3 Drawing Sheets

(51) Int. Cl.
  *H02K 3/46* (2006.01)
  *H02K 3/52* (2006.01)
  *H02K 3/28* (2006.01)
(52) U.S. Cl.
  CPC ......... *H02K 3/522* (2013.01); *H02K 2203/06* (2013.01)
(58) Field of Classification Search
  USPC .................................................. 310/208, 194
  See application file for complete search history.

(56) References Cited

U.S. PATENT DOCUMENTS

| | | | |
|---|---|---|---|
| 2008/0265701 A1 | 10/2008 | Ueda et al. | |
| 2010/0141067 A1* | 6/2010 | Kitagawa | H02K 3/522 310/71 |
| 2010/0244597 A1* | 9/2010 | Sugiyama | H02K 3/522 310/71 |
| 2011/0215660 A1* | 9/2011 | Goto | H02K 3/24 310/53 |
| 2011/0278974 A1* | 11/2011 | Matsuyama | H02K 3/522 310/71 |

FOREIGN PATENT DOCUMENTS

| | | | |
|---|---|---|---|
| EP | 1947755 A1 | | 7/2008 |
| JP | 2006296104 A | | 10/2006 |
| JP | 2007074838 A | | 3/2007 |
| JP | 2007135339 A | | 5/2007 |
| JP | 2008278636 A | * | 11/2008 |
| JP | 2008312290 A | | 12/2008 |
| JP | 2010141965 A | | 6/2010 |
| JP | 2010142075 A | | 6/2010 |

OTHER PUBLICATIONS

Yoshida et al., Machine Translation of JP2006296104, Oct. 2006.*
Anzai et al., Machine Translation of JP2007-074838.*
Ishizeki, Machine Translation of JP2008278636.*

* cited by examiner

STATOR SYSTEM FOR AN ELECTRIC MOTOR

CROSS-REFERENCE TO RELATED APPLICATION

This application is a continuation, under 35 U.S.C. §120, of copending international application No. PCT/EP2013/001541, filed May 24, 2013, which designated the United States; this application also claims the priority, under 35 U.S.C. §119, of German patent application No. DE 10 2012 010 234.8, filed May 24, 2012; the prior applications are herewith incorporated by reference in their entirety.

BACKGROUND OF THE INVENTION

Field of the Invention

The invention lies in the field of electric motors and relates, more particularly, to a stator system for an electric motor having multiple coil formers and stator windings that are wound on the coil formers and are distributed over the circumference of the stator system.

In the case of a three-phase electric motor, the (fixed) stator system comprises a number of cascading coil pairs as magnetic poles which, when energized, generate a magnetic exciter field. A rotor is rotatably mounted inside the stator system. The rotor is itself provided with a coil winding or field winding in the case of a brushless electric motor that has permanent magnets and in the case of a so-called commutator motor. When an electric current flows through the phase windings that are formed by the stator-side coils, then an exciter field that alternates with the magnetic field of the rotor is built up, as a consequence of which the rotor rotates about its axis of rotation.

Typically, in a stator system of this type that has stator teeth, which are arranged in a star-shaped manner, and stator grooves, which are provided between the teeth, a number of coil pairs are provided on the stator teeth taking into consideration the desired (electrical) phase winding in the individual tooth technology. During operation, different coil pairs carry different current phases, wherein the conductor tracks that couple stator windings or rather coils of a coil pair are conventionally routed at least in part over adjacent coil pairs and are arranged at that location in such a manner that they lie adjacent to one another.

Stator systems of this type are by way of example used in electric motors for servo drives in motor vehicle steering systems. Particularly when using draw-in winding technology, the problem arises under certain circumstances that coils or the conductor tracks of coil pairs that have different phases can make contact in an electrically conductive manner. The phase-to-phase short circuits that occur cause the electric motor to malfunction and produce an increased braking torque that is undesirable and critical as far as safety is concerned during steering applications.

In order to avoid this phase-to-phase short circuit problem, the conductor tracks of different coil formers are generally encased by an electrically non-conductive insulating sleeving formed of a synthetic material. As a consequence, an additional production step is provided in the production process of the stator system and the additional step has a negative influence on the production costs and the duration of the production process of the stator system.

SUMMARY OF THE INVENTION

It is accordingly an object of the invention to provide a stator system of an electric motor which overcomes the above-mentioned and other disadvantages of the heretofore-known devices and methods of this general type and which provides for a stator system that, in a simple and cost-effective manner, ensures a phase separation that is in a condition for safe operation in the case of cascading coil pairs in a stator star.

With the foregoing and other objects in view there is provided, in accordance with the invention, a stator system for an electric motor, comprising:
a plurality of coil formers;
stator windings wound on said coil formers, said stator windings being distributed over a circumference of the stator system and disposed to form a substantially circular stator star;
a phase separator disposed to electrically insulate a number of said stator windings in an axial direction;
a conductor track electrically connecting said stator windings of at least two respective said coil formers to form a coil pair; and
a separating web retaining each said conductor track, said separating web being disposed in an axial direction above the respectively allocated said phase separator.

In other words, the stator system is a component of an electric motor, wherein the electric motor can be provided with brushes (commutator motor) or can be brushless. The stator system comprises a number of coil formers that are each covered by a stator winding. The stator winding is by way of example a coil that is produced from a lacquered copper wire. The coil formers and the stator windings that are located on the coil formers are arranged in such a manner so as to form a circular stator star, wherein the central openings of the coils extend in a radial manner. The axial direction of the electric motor, in other words the axis of rotation of the rotor, is coaxial with the axis of the stator star that consequently comprises a hollow-cylindrical shape.

Stator windings that are adjacent to one another are electrically insulated with respect to one another by way of example in that a space is provided between the stator windings and an electric insulator is arranged within this space. The insulator is in particular a synthetic material but it can also be air. Moreover, a number of stator windings are electrically insulated in the axial direction by means of a phase separator. In an expedient manner, the stator windings are electrically insulated in each case by means of one of the phase separators that is allocated to the respective stator winding. The phase separators are accordingly separate components. It is however likewise possible to involve a single phase separator, wherein the phase separator is embodied in an expedient manner in the form of a ring or ring-segment. It is preferred that the phase separator is produced from a synthetic material and in particular placed on the respective stator windings. A conductor track is guided over the phase separator. This conductor track that runs axially above the phase separator is part of the winding wire that forms the coil or coil winding or rather is part of a corresponding winding line. In other words, the phase separator is consequently located between the conductor track and the stator winding.

Two stator windings of the stator system are electrically connected to one another by means of the conductor track to form a coil pair, wherein the stator windings are not directly adjacent to one another. By way of example, the two stator windings of the coil pair are located on stator teeth that are offset by essentially 90° with respect to one another. It is preferred that the conductor track runs in an essentially tangential manner. In other words, the conductor track is guided over all the stator windings that are located between the two stator windings of a coil pair, and each of these stator windings is electrically insulated in particular by means of one of the phase separators with respect to the conductor track.

The conductor track is retained by means of a separating web, wherein the conductor track is arranged in particular between the separating web and the phase separator. By way of example, the separating web extends in a radial manner and essentially at right angles to the conductor track. The separating web is by way of example connected to one of the coil formers or is fastened to the phase separator, above which the separating web is located. By way of example, the separating web is fixedly adhered at that location or is welded to the respective component, for example by means of ultrasound welding.

By virtue of using the separating web, the position of the conductor track is stabilized and the conductor track is prevented from moving towards a further electrically conductive component, in particular an adjacent conductor track, during operation of the electric motor. By virtue of using the separating web, it is furthermore possible to wind the coil pair without performing an additional production step and to form the stator star. As a consequence, the production costs of the stator system are advantageously reduced.

In a suitable embodiment, the conductor tracks are essentially fastened between the separating web, which is preferably produced from an electrically non-conductive synthetic material, and the phase separators in a clamped manner without becoming damaged and as a consequence are galvanically separated from adjacent conductor tracks and the stator windings.

In accordance with an added feature of the invention, the separating web is latched with the allocated coil former. As a consequence, a particularly simple, cost-effective and operationally safe phase insulation is produced. By virtue of the latching arrangement, the conductor tracks are electrically insulated with respect to one another or rather spatially galvanically separated in a simple manner. Phase-to-phase short circuits as a result of possible damage to the conductor tracks are consequently reliably avoided.

In a suitable embodiment, the phase separator extends essentially over the entire axial length and the radial width of the coil former. In a suitable embodiment, the phase separators are consequently lengthened or rather widened in comparison to conventional embodiments so that multiple conductor tracks can be arranged adjacent to one another on the phase separators without any problem, by way of example essentially running tangentially with respect to the stator star. In so doing, it is reliably prevented that the conductor tracks contact one another or the stator windings of the respective coil former.

In accordance with a further advantageous embodiment, the separating web that is suitably embodied in an almost rectangular-shaped manner extends in the assembled state essentially over the entire radial width of the respective coil former of the stator star. As a consequence, it is possible to latch the separating web on the phase separator in a condition for safe operation, by way of example on retaining contours of the corresponding axially lengthened coil formers.

In a suitable further development, the separating web comprises a recess that is open towards the phase separator so as to receive the conductor track. As a consequence, a phase insulation that is in a condition for safe operation is achieved by means of the phase separator and the separating web. The separating web is produced in a comparatively cost-effective manner since additional components, such as for example screws or the like are not required to retain the respective conductor track.

The recess that is tailored to suit the cross sectional shape of the conductor track that is suitably embodied in the form of a corresponding section of the winding wire of the coil pair is in the cross section a circular segment that is greater than 180°. In this manner, it is rendered possible that the conductor tracks are inlaid in a non-positive locking manner within the respective recess. In other words, during the process of assembling the stator system, each conductor track is snapped into the respective recess corresponding thereto. By virtue of the fastening arrangement of this type, it is possible to forego the use of adhesives as an additional aid during the assembly process. It is likewise not necessary to weld together the conductor track and the respective separating web to produce a reliable connection.

In particular, the recess is inclined in an advantageous embodiment of the separating web so that it is ensured that the separating web that is arranged essentially in a radial manner with respect to the stator star can receive the conductor track that is arranged in an almost tangential manner with respect to the stator star on the phase separators. In other words, the recess that is incorporated in the separating web consequently comprises in this embodiment both radial and also tangential components. This is particularly of advantage if the electrical connection between the conductor track and one of the coil formers of one of the coil pairs is located comparatively close to the inner face of the stator star, whereas the electric connection between the conductor track and the other coil former of the coil pair is comparatively close to the outer face of the stator star.

In order to reduce the material cost, it is rendered possible with the conductor track to achieve a comparatively short connection between the two electrical connections, wherein the conductor track is guided within the recess. In particular, bends or creases are not introduced into the respective conductor track.

Furthermore, the separating web in a preferred embodiment comprises a number of (inclined) recesses that are spaced apart from one another in a radial manner so that essentially each conductor track lies on the phase separator in the assembled state in a separate recess of the separating web. As a consequence, a phase insulation that is in a condition for a particularly safe operation is ensured by means of the phase separator and the separating web.

In a particularly advantageous embodiment of the latching connection between the separating web and the respective coil former, a recess is incorporated in the coil former, above which the conductor track is arranged. The recess comprises in its edge region two latching hooks that in the assembled state latch with the separating web. In other words, the separating web lies at least in part in a positive-locking manner within the recess and is retained at that location in a non-positive locking manner by means of the latching hooks. By way of example, the recess is located on the side of the coil former that is facing the inner face or the outer face of the stator star. However, it is also feasible that a recess of this type is incorporated in the coil former both on the inner face and also on the outer face. The separating web is latched on both sides by the coil former. As a consequence, it is rendered possible to fasten the separating web to the coil former in a particularly simple and cost-effective manner.

In a suitable further development, a securing element is formed as one on the separating web and the securing element lies against a corresponding stop surface of the coil former. As a consequence, the latching connection is advantageously improved and simplified in its form lock, as a consequence of which it is ensured that the phases are separated in a particularly reliable manner even in the case of shocks and vibrations during operation of the electric motor.

In an expedient manner, the separating web is articulated in the form of a film hinge at the coil former. By way of example, the free end of the separating web is latched so as to be assembled with the coil former. In one embodiment that is advantageous in this respect, the coil former is produced using an injection molding method and the separating web is directly molded onto the coil former. By virtue of the one-piece embodiment and also producing the two elements in one process step, the production costs of the stator system are advantageously reduced. Furthermore, the costs of holding items in storage are reduced in the case of producing a stator system of this type. The free end of the film hinge-separating web is latched in a simple manner with the recess of the latching connection for assembly purposes.

With the above and other objects in view there is also provided, in accordance with the invention, an electric motor, in particular a servo drive of a motor vehicle steering system, that comprises a stator system as described herein. A simple, cost-effective and operationally safe phase separation is achieved by virtue of using the stator system in accordance with the invention. As a consequence, phase-to-phase short circuits and an increased braking torque that is undesirable and critical as far as safety is concerned during steering applications are advantageously avoided.

Other features which are considered as characteristic for the invention are set forth in the appended claims.

Although the invention is illustrated and described herein as embodied in a stator system for an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
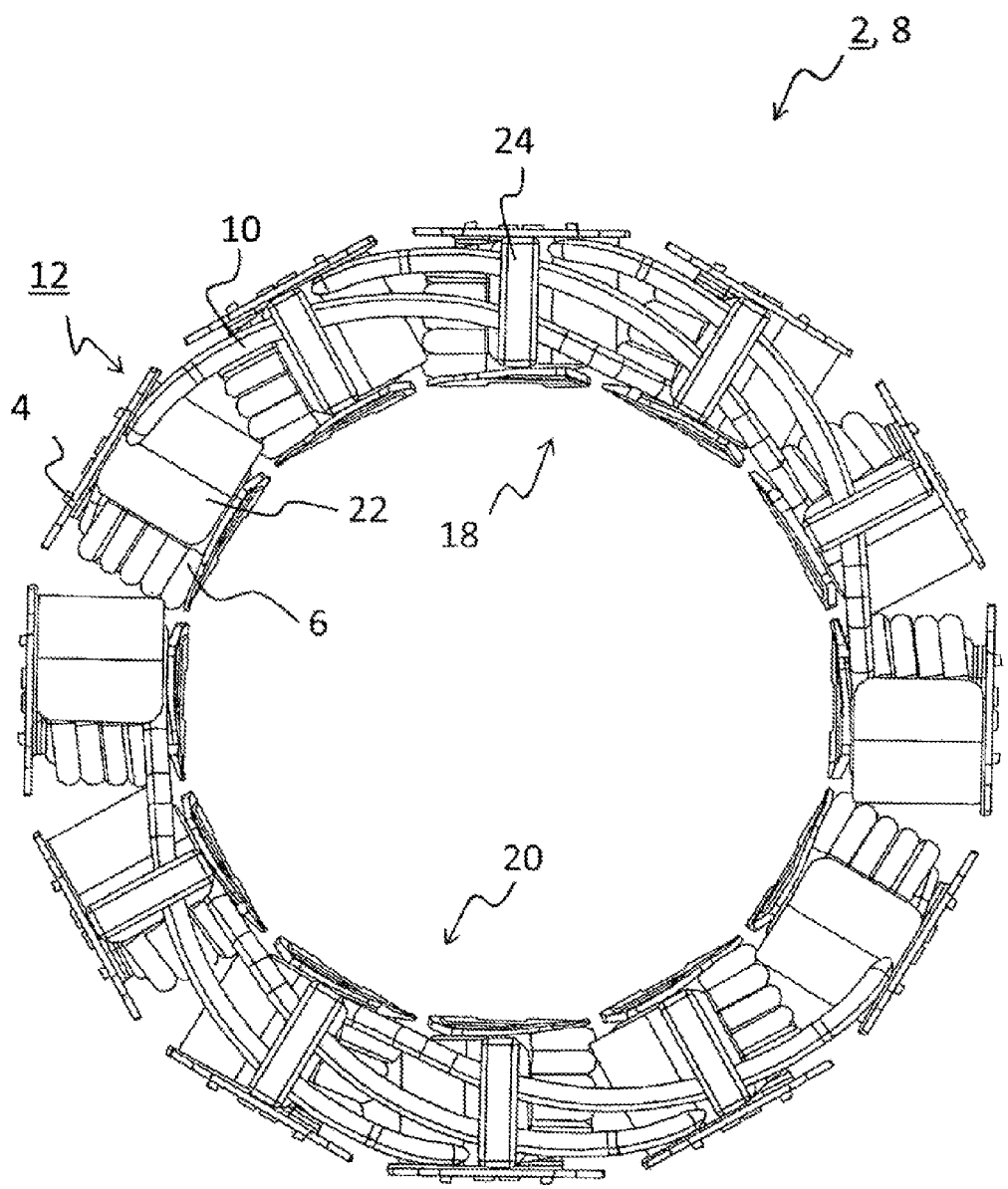
FIG. 1 illustrates a plan view of the stator star of a six-pole stator system comprising twelve coil formers having stator windings, wherein in each case two coil formers are embodied with a conductor track to a coil pair as a magnetic pole.

Referring now to the figures of the drawing in detail and first, particularly, to FIG. 1 thereof, there is shown a stator system 2 for an electric motor. The latter is not illustrated in detail. The stator system 2 has twelve coil formers 4 as individual stator teeth that comprise coils 6 or stator windings that are wound on the coil formers.

The coil formers 4 are arranged to form an annular, circular stator star 8. In the assembled state, a rotor of the electric motor is arranged inside the stator star 8, the rotor being rotatably mounted in the magnetic exciter field of the stator system 2. Each two coil formers 4 with the respective stator windings 6 are electrically connected in an electrically conductive manner by means of a conductor track 10 and are combined to form a coil pair 12 as one assembly unit. The respective conductor track 10 is a component of the corresponding coil winding or rather stator winding 6. By way of example, in each case only one coil pair assembly unit of this type is provided in the figures with reference numerals.

During operation of the electric motor, electric current flows through the six cascading coil pairs 12 and the coil pairs form six magnetic pole regions of the stator system 2. The coil pairs 12 of the stator star 2 are electrically switched one to the other in series or in parallel. The conductor track 10 of a coil pair 12 extends essentially in each case over the coil former 4 of two further coil pairs 12.

Figure 2:
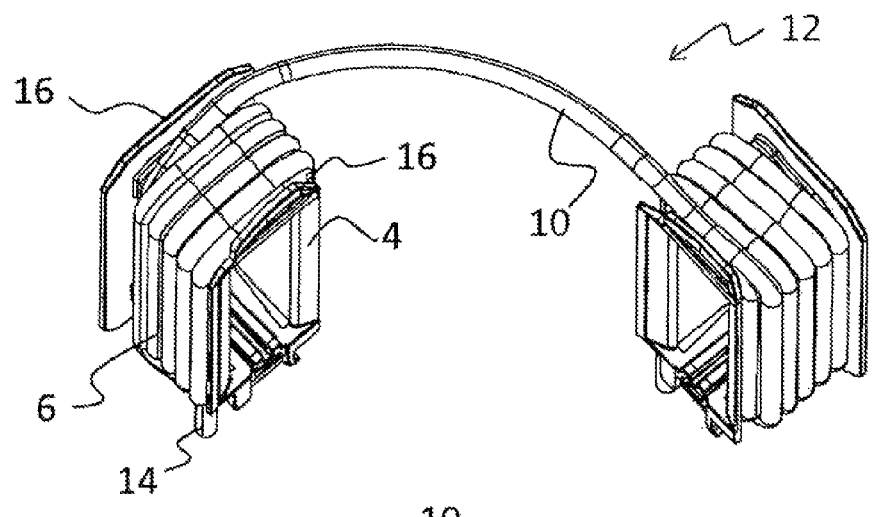
FIG. 2 is a perspective view of a coil pair.

FIG. 2 illustrates in detail an exemplary embodiment of a coil pair 12. The stator windings 6 comprise in each case two connection ends, namely a contacting end 14 and a connecting end that extends as a conductor track 10 between the coils. The stator windings 6 of the two coil formers 4 and also the conductor track 10 are embodied in one piece from a copper wire that is wound around the coil formers 4 by means of individual tooth-winding technology. In this embodiment, six stator windings 6 are wound around each coil former 4 of a coil pair 12. The coil formers 4 are essentially rectangular injection molded components that are embodied from an electrically non-conductive synthetic material and comprise in the radial direction—towards the inner and outer circumference of the stator star 2—a retaining wall 16. The coil former 4 consequently comprises in the axial direction an essentially H-shaped cross-section, wherein the stator windings 6 are wound around the horizontal H-limb.

The contacting ends 14 are contacted by means of a pressing process or the like in a suitable manner by the adjacent coil pairs 12 of the identical phase by way of a weld or solder connection. The stator system 2 comprises essentially —as is evident in FIG. 1—an upper coil pair assembly unit 18 and a lower coil pair assembly unit 20, wherein the contacting ends 14 of the respective outer coil former 4 of the respective coil assembly unit 18, 20 is coupled to a control device, not illustrated in detail, and an energy source in order to control and supply the stator system 2. The coil pair assembly units 18, 20 comprise in each case three coil pairs 12 that are switched one to the other in series in such a cascading electric manner that during operation of the coil pair group 18, 20 each conductor track 10 carries a different current phase.

Figure 3:
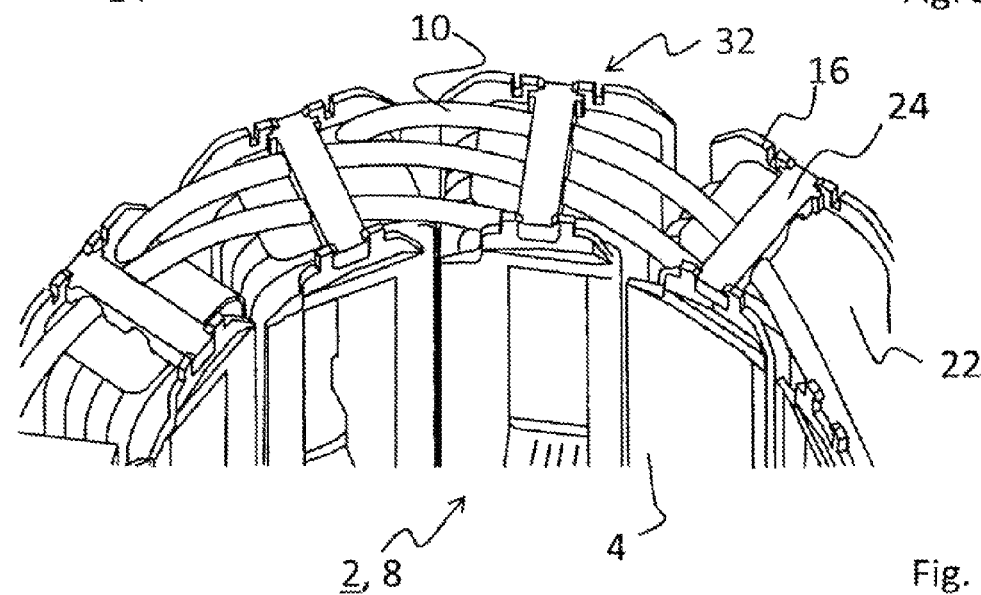
FIG. 3 is a perspective view of a detail of the coil former of the stator star having phase separators and separating webs for galvanically separating the conductor tracks and the stator windings.

A phase separator 22 is allocated in each case to the coil formers 4 in the region of the conductor tracks 10 in order to galvanically separate the current phases between a conductor track 10 and the stator windings 6 of the coil pairs 12. The phase separators 22 insulate the stator windings 6 in the axial direction and extend—as is evident in FIG. 3—essentially over the entire axial length and the radial width of the coil former 4. The conductor tracks 10 of the coil pairs 12 are routed on the phase separators 22 essentially in a tangentially manner towards the stator star 8, wherein multiple conductor tracks 10 are arranged adjacent to one another on a phase separator 22 preferably in the form of a triple spiral.

The conductor tracks 10 of four inner coil formers 4 of the coil assembly units 18, 20 are in addition fixedly clamped to a separating web 24 that is arranged in a radial manner with respect to the stator star 8. The separating web 24 is produced from an electrically non-conductive synthetic material and extends essentially over the entire radial width of the respective coil former 4 of the stator star 8.

Figure 4:
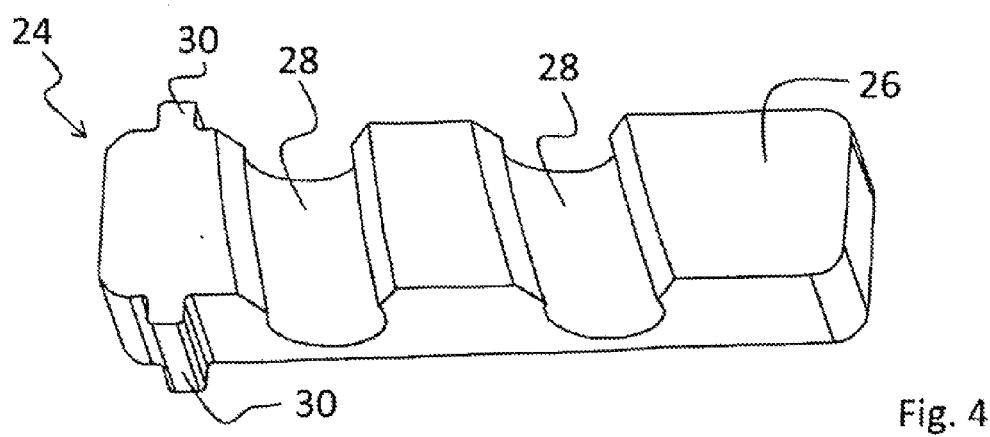
FIG. 4 is a perspective view of a separating web having recesses that are arranged in an inclined manner.

FIG. 4 illustrates the construction of a separating web 24 of this type having an essentially rectangular-shaped separating web body 26, two recesses 28 for receiving the conductor tracks 10 and two fixing webs 30 that are formed as one thereon as radial securing elements or stop elements. The fixing webs 30 are arranged in a perpendicular manner with respect to the separating web body 26 at the end that is on the outer circumference side in the assembled state so that the separating web 24 is essentially T-shaped. The recesses 28 are aligned in the assembled state towards the phase separator 22 and comprise in their cross-section a circular segment that is greater than 180° so that the conductor tracks 10 can be clipped into the recesses 28 and are retained in an operationally secure manner.

The recesses 28 are spaced apart in a radial manner with respect to one another and extend in an inclined manner towards the separating web 24 so that the conductor tracks 10 that are arranged tangentially in a spiral-like manner can be clipped without any problems into the separating web 24. The separating web 24 galvanically spatially separates and securely retains the conductor tracks 10 that are preferably embodied as multi-stranded copper wires so that phase-to-phase short circuits between adjacent conductor tracks 10 as a result of possible damage to their individual wires are reliably avoided.

Figure 5:
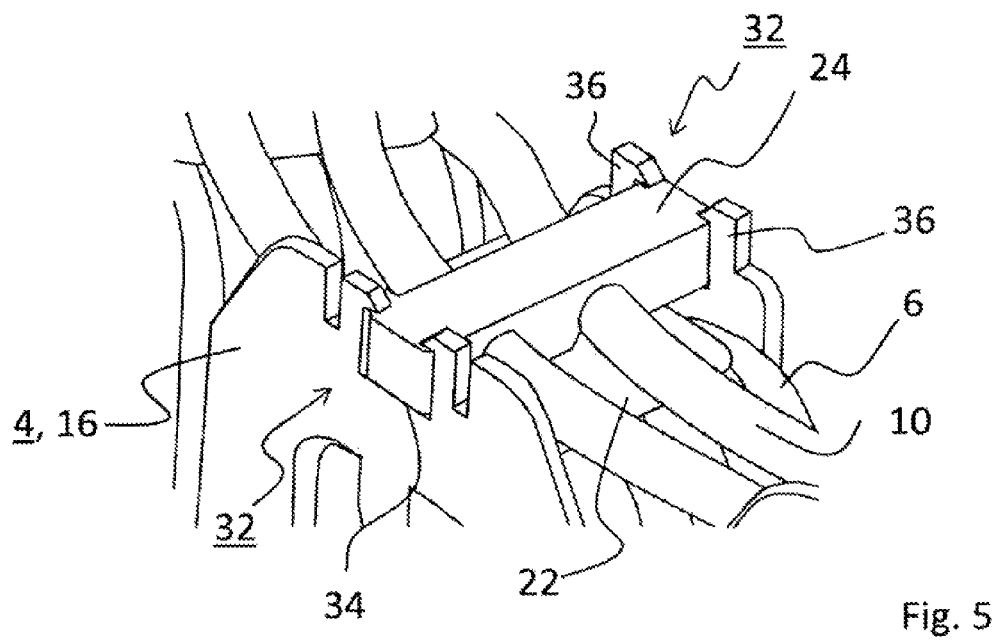
FIG. 5 illustrates a detail of the latching connection of the separating web showing the radial recesses of the coil former, the recesses being incorporated in the coil former and provided with latching hooks.

The separating webs 24 can be fastened by means of a latching device 32 of the retaining walls 16 to the coil formers 4 in a clamped manner without becoming damaged. FIG. 5 illustrates in greater detail a detail of the latching device 32. For this purpose, the retaining walls 16 comprise an essentially U-shaped latching contour 34 on the separating web-side on the inner and outer circumference of the stator star 8. Two latching hooks 36 are arranged in each case inwardly facing one another and in the form of an overhang on the upper ends of the vertical U-limbs and in the clipped-in, assembled state the latching hooks fix the separating web 24 in the axial direction. The fixing webs 30 of the separating web 24 lie in a radial manner in the assembled state against the vertical U-limbs of the latching contour 34 towards the outer circumference of the stator star 8. As a consequence, the form lock of the latching device 32 is improved, as a consequence of which it is ensured that the phases are separated in a particularly reliable manner even in the case of shocks and vibrations during operation of the electric motor.

Figure 6:
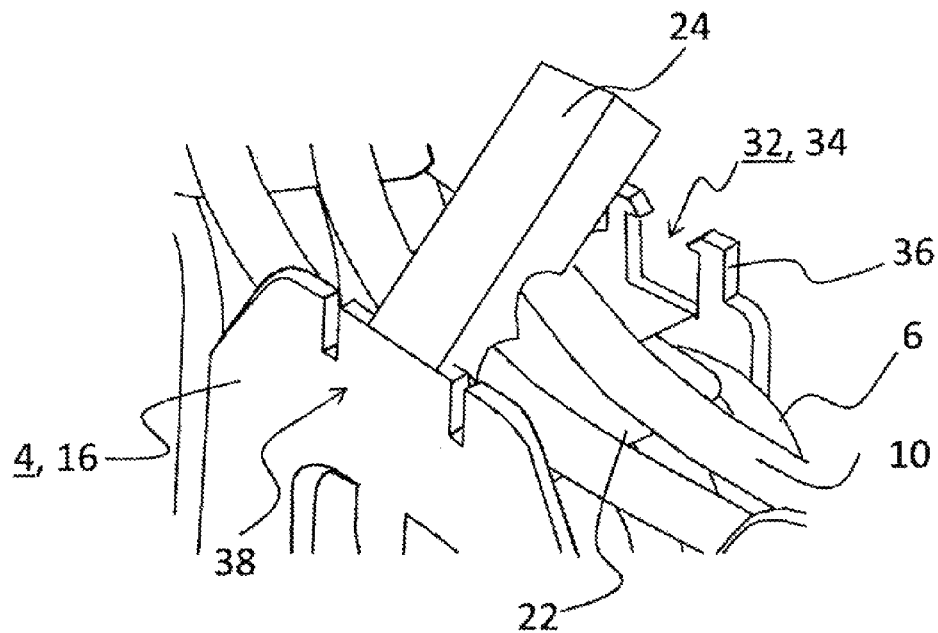
FIG. 6 is a view of a detail of the latching connecting of the separating web in the form of a film hinge.

FIG. 6 illustrates an alternative embodiment of the coil former 4 and the separating web 24 in the form of a film hinge 38. In this embodiment, the latching device 32 is replaced at the outer circumference of the stator star 8 by the film hinge 38. The coil former 4 and the separating web 24 are embodied in this embodiment as a common injection molded component, wherein the separating web 24 can be clipped as a hinge bracket at the free end side into the latching contour 34 at the inner circumference.

The invention is not limited to the above described exemplary embodiments. On the contrary, the person skilled in the art can also derive therefrom other variants of the invention without departing from the subject of the invention. In particular, all the individual features that are described in connection with the different exemplary embodiments can moreover also be combined with one another in other ways without departing from the subject of the invention.

The following is a summary list of reference numerals and the corresponding structure used in the above description of the invention:

2 Stator System
4 Coil Former
6 Stator Winding
8 Stator Star
10 Conductor Track
12 Coil Pair
14 Contacting End
16 Retaining Wall
18, 20 Coil Pair Assembly Unit
22 Phase Separator
24 Separating Web
26 Separating Web Body
28 Recess
30 Fixing Web
32 Latching Device
34 Latching Contour
36 Latching Hook
38 Film Hinge

The invention claimed is:

1. A stator system for an electric motor, comprising:
a plurality of coil formers;
stator windings wound on said coil formers, said stator windings being distributed over a circumference of the stator system and disposed to form a substantially circular stator star having an axis extending substantially coaxially with an axis of the electric motor;
a plurality of conductor tracks, each said conductor track electrically connecting said stator windings of at least two respective said coil formers to form a coil pair;
a plurality of phase separators disposed to electrically insulate respective said stator windings in an axial direction, each said phase separator being disposed between at least one of said conductor tracks and a respective said stator winding; and
a plurality of separating webs, each said separating web assembled to a respective said coil former and retaining at least one of said conductor tracks, each said separating web being disposed in an axial direction above a respective said phase separator, and each said separating web having at least one recess formed therein that is open towards the respective said phase separator and is configured to receive said at least one of said conductor tracks.

2. The stator system according to claim 1, wherein each said separating web is oriented to extend radially.

3. The stator system according to claim 1, wherein each said separating web is latched to the respective said coil former.

4. The stator system according to claim 1, wherein each said phase separator extends substantially over an entire axial length and a radial width of the respective said coil former.

5. The stator system according to claim 1, wherein each said separating web, in an assembled state, extends substantially over an entire radial width of the respective said coil former of said stator star.

6. The stator system according to claim 1, wherein said at least one recess, in cross section, is a circular segment greater than 180°.

7. The stator system according to claim 1, wherein said recess in each said separating web is an inclined recess.

8. The stator system according to claim 1, wherein said at least one recess is one of a plurality of recesses that are spaced apart from one another in a radial direction.

9. The stator system according to claim 1, wherein each said separating web is latched to the respective said coil former by way of a latching connection comprising a latching contour formed in the respective said coil former and provided with latching hooks, and wherein said separating web lies in said latching contour.

10. The stator system according to claim 1, which comprises a securing element formed onto each said separating web and lying radially against a corresponding stop surface of the respective said coil former.

11. The stator system according to claim 1, wherein each said separating web is articulated to the respective said coil former via a film hinge.

12. An electric motor, comprising a stator system according to claim 1.

13. The electric motor according to claim 12, configured as a servo drive of a motor vehicle steering system.

* * * * *